(12) United States Patent
Nagshain

(10) Patent No.: US 6,985,996 B1
(45) Date of Patent: Jan. 10, 2006

(54) METHOD AND APPARATUS FOR RELOCATING RAID META DATA

(75) Inventor: Madhuresh Nagshain, Milpitas, CA (US)

(73) Assignee: Adaptec, Inc., Milpitas, CA (US)

(\*) Notice: Subject to any disclaimer, the term of this patent is extended or adjusted under 35 U.S.C. 154(b) by 252 days.

(21) Appl. No.: 10/318,587

(22) Filed: Dec. 13, 2002

(51) Int. Cl.
*G06F 12/16* (2006.01)

(52) U.S. Cl. .............. 711/114; 711/165; 711/170; 714/6

(58) Field of Classification Search .............. 711/114, 711/165, 170; 714/6
See application file for complete search history.

(56) References Cited

U.S. PATENT DOCUMENTS

| | | | | |
|---|---|---|---|---|
| 6,289,356 B1 * | 9/2001 | Hitz et al. | ............... | 707/201 |
| 6,427,212 B1 * | 7/2002 | Frey, Jr. | ............... | 714/6 |
| 6,467,023 B1 * | 10/2002 | DeKoning et al. | ............... | 711/114 |
| 6,502,174 B1 * | 12/2002 | Beardsley et al. | ............... | 711/170 |
| 6,643,654 B1 * | 11/2003 | Patel et al. | ............... | 707/10 |
| 6,675,176 B1 * | 1/2004 | Shinkai et al. | ............... | 707/200 |
| 6,721,764 B2 * | 4/2004 | Hitz et al. | ............... | 707/202 |
| 6,738,863 B2 * | 5/2004 | Butterworth et al. | ............... | 711/114 |
| 6,766,430 B2 * | 7/2004 | Arakawa et al. | ............... | 711/165 |
| 6,779,094 B2 * | 8/2004 | Selkirk et al. | ............... | 711/165 |
| 6,816,957 B1 * | 11/2004 | Halladay et al. | ............... | 711/170 |

\* cited by examiner

*Primary Examiner*—T. Nguyen
(74) *Attorney, Agent, or Firm*—Martine Penilla & Gencarella, LLP

(57) ABSTRACT

Methods and an apparatus for enabling the interoperability of a RAID implementation between different host systems by compacting the meta data so the meta data is accessible by the different systems are provided. In one embodiment, a method for enabling interoperability of a RAID implementation between different host systems is provided. The method initiates with meta data being identified for a RAID implementation. Next, the meta data of the RAID implementation is stored. Then, the RAID implementation is transferred from a first host system to a second host system. Next, the meta data for each disk of the RAID implementation is accessed in response to the start-up of the second host system. The compact meta data allows for a simplified migration process also. Computer readable media and a RAID system are also provided.

20 Claims, 6 Drawing Sheets

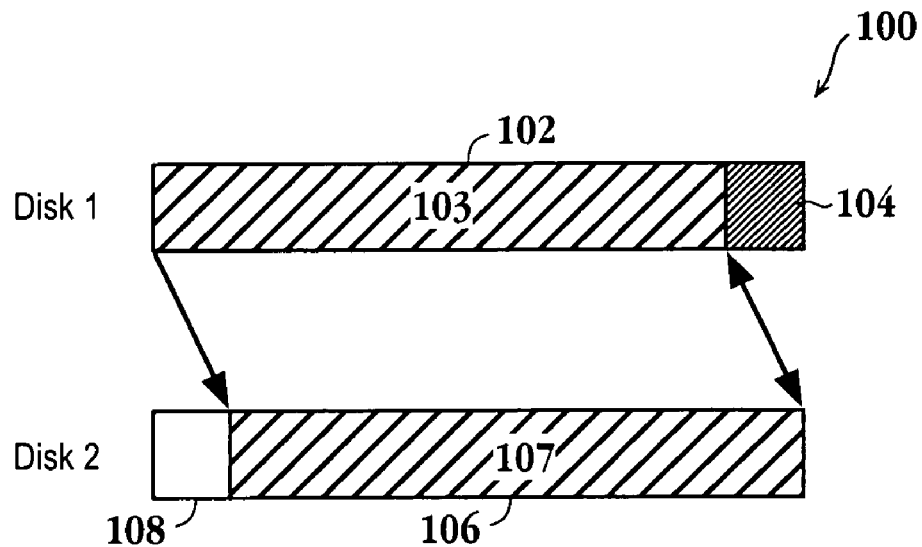
Fig. 1A *(prior art)*
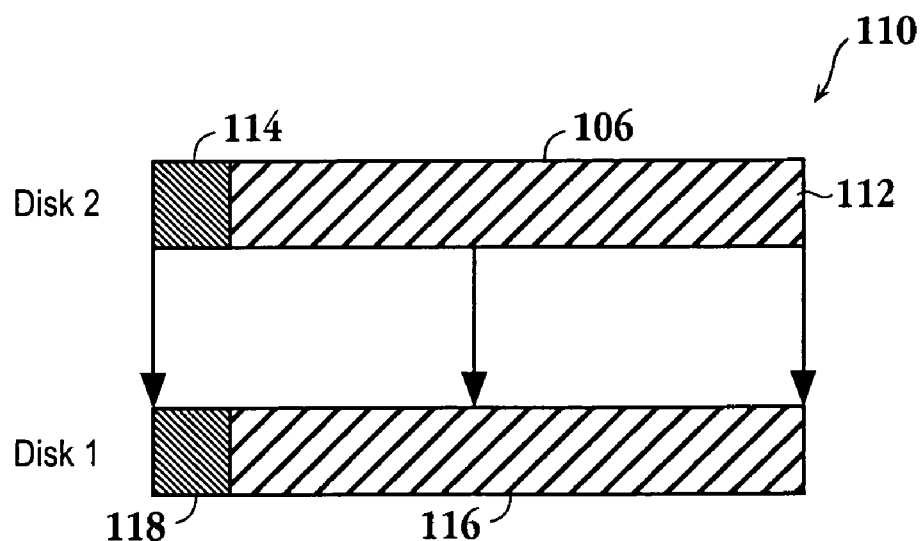
Fig. 1B *(prior art)*

METHOD AND APPARATUS FOR RELOCATING RAID META DATA

BACKGROUND OF THE INVENTION

1. Field of the Invention

This invention relates generally to methods and apparatus for allowing inter-operabiltity between computer systems and more particularly to provide the capability to move hard disks of a redundant array of inexpensive disks (RAID) between computers without losing any data and maintaining the properties of the members of the RAID.

2. Description of the Related Art

RAID systems are commonly employed throughout computers today. Mirroring, striping, parity and hybrids of these implementations are prevalent in computers and provide for a high degree of data availability in the case of disk failure. The hard disks used for the various RAID systems contain meta data i.e., data that describes the structure configuration, attributes, etc. of the data stored on the disk.

The meta data is important for the computer system or RAID controller to understand how the data is organized in the RAID system. If for some reason, the computer, with which the RAID system was in communication with, fails while the RAID system is intact, then the RAID system can be transferred to another computer in order to retrieve the data with the assistance of the meta data. Meta data can be stamped on the first few sectors of every disk, i.e., member of the RAID. Alternatively, the RAID meta data can be stored on non volatile memory of a RAID card or a system motherboard. However, the meta data stamped on the first few sectors suffers from the same shortcomings for meta data stored separately from the disks. That is, it is only possible to move the disks to a second computer if the hardware and software that interfaces with the RAID is manufactured by the same company. Otherwise, the second computer system will not recognize the disks or the data contained on the disks of the RAID.

In addition, the process of creating a RAID mirroring system from a single disk containing data is a cumbersome process, since the first few sectors of each of the disks for a RAID must be set aside for the meta data. For example, where a user has a system with a single disk containing data which they would like to convert to a RAID mirroring system, the data on the single disk must be migrated so the first "n" sectors of the disk are free to be stamped with the meta data. FIGS. 1A and 1B illustrate the operations for migrating data from a first disk to a second disk to create a RAID mirroring system. Block diagram 100 of FIG. 1A displays disk 1 102 and disk 2 106. Disk 1 102 contains data in region 103 that a user would like to implement as a RAID mirroring system. In order to migrate the data so that disk 2 106 is a copy of disk 1 102, the data from disk 1 of region 103 is copied to disk 2 in region 107. However, the data is shifted by at least "n" sectors on disk 2 106 in order to leave region 108 empty on disk 2 so that the meta data can be stamped into the first "n" sectors (or more) of disk 2. In doing this, the data in at least the last "n" sectors 104 of disk 1 102 will be lost if disk 1 and disk 2 106 are the same size.

FIG. 1B displays disk 2 106 being stamped with meta data in the first "n" sectors 114 of disk 2 106. The contents of disk 2 106 are then copied down to disk 1 102. Accordingly, disk 1 102 contains the meta data in the first "n" sectors 118 and disk 1 102 and disk 2 106 are duplicate images capable of being implemented in a RAID. Moreover, the migration process becomes more cumbersome for a RAID implementation using striping, as an extra step is needed to temporarily store the stripe over three or four disks.

As a result, there is a need to solve the problems of the prior art to provide for interoperability of RAID systems and simplify the migration process for implementing a RAID mirroring system from a single disk.

SUMMARY OF THE INVENTION

Broadly speaking, the present invention fills these needs by providing a method and apparatus enabling interoperability of a RAID implementation between different host systems. Additionally, the compact meta data, which enables interoperability of the RAID implementation, allows for a simplified migration process. It should be appreciated that the present invention can be implemented in numerous ways, including as a process, an apparatus, a system, or a device. Several inventive embodiments of the present invention are described below.

In one embodiment, a method for creating a RAID mirroring system from a first disk containing a user's data is provided. The method initiates with identifying meta data for the first disk. Next, the meta data is introduced to a last sector of the first disk. Then, the user's data and the meta data of the first disk are copied to a second disk, where the meta data is copied to a last sector of the second disk. Next, the first disk and the second disk are arranged as a RAID mirroring system.

In another embodiment, a method for enabling interoperability of a RAID implementation between different host systems is provided. The method initiates with meta data being identified for a RAID implementation. Next, the meta data of the RAID implementation is stored. Then, the RAID implementation is transferred from a first host system to a second host system. Next, the meta data for each disk of the RAID implementation is accessed in response to the start-up of the second host system.

In yet another embodiment, a method for enabling meta data of a RAID implementation to be recognized by different host systems is provided. The method initiates with identifying meta data for a RAID implementation. Then, the meta data of the RAID implementation is stored in a non-volatile random access memory (NVRAM) if access to the NVRAM is available. If access to the NVRAM is not available, then the meta data for the RAID implementation is stored in a last sector of each disk of the RAID implementation. Next, the RAID implementation is transferred from a first host system to a second host system. Then, the meta data is accessed in the NVRAM or the last sector of each disk of the RAID implementation in response to the start-up of the second host system. Next, it is determined if the meta data requires modification to communicate with the second host system.

In still another embodiment, a computer readable media having program instructions for enabling interoperability of a RAID implementation between different host systems is provided. The computer readable media includes program instructions for identifying meta data for a RAID implementation and program instructions for storing the meta data of the RAID implementation. Program instructions for transferring the RAID implementation from a first host system to a second host system are included. Program instructions for accessing the meta data for each disk of the RAID implementation in response to the start-up of the second host system are also included.

In another embodiment, a RAID system is provided. The RAID system includes at least two disks arranged as a RAID implementation. Meta data configured to fit on a sector of a storage medium is included. The meta data defines a RAID configuration, and the meta data is configured to be accessible and modifiable in order for the RAID system to be interoperable with different host systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1A is a schematic diagram illustrating a first operation for migrating data from a first disk to a second disk to create a RAID mirroring system.

FIG. 1B is a schematic diagram illustrating a second operation for migrating data from a first disk to a second disk to create a RAID mirroring system.

DETAILED DESCRIPTION OF THE PREFERRED EMBODIMENTS

An invention is described for an apparatus and method for providing a fixed table structure for each hard disk of a redundant array of inexpensive disks (RAID) system such that the fixed table structure becomes a component of the system. Thus, the RAID system becomes interoperable and the migration process for implementing a RAID mirroring system from a single disk is simplified. It will be obvious, however, to one skilled in the art, that the present invention may be practiced without some or all of these specific details. In other instances, well known process operations have not been described in detail in order not to unnecessarily obscure the present invention.

The embodiments of the present invention include a method of creating a RAID mirroring system from a single disk containing data. By compacting the RAID meta data and moving the meta data to the end sector of a disk, the process of writing the meta data and a user's data to a second disk for a RAID mirroring implementation is simplified. As used herein, the meta data refers to a fixed table structure containing data on the RAID configuration. The compacted RAID meta data is a maximum of 180 bytes long, in one embodiment. In another embodiment, the meta data consists of three 32 bit words. Thus, the meta data takes up only one sector. Accordingly, the fixed table structure, i.e., the meta data, can be associated with each hard disk such that if a complete RAID implementation is moved from one system to another system, the properties are fully maintained and there is no loss of data. It should be appreciated that the properties of a RAID implementation that communicates to the host through a host bus adapter card would also be maintained by the embodiments discussed herein. Furthermore, this table structure can be placed so that it becomes a component of the RAID and allows different systems to read the configuration code for the RAID during the boot-up process. The agencies, such as the system basic input output system (BIOS), the device driver of the operating system (OS) and RAID management software, all requiring access to the fixed table structure when a RAID implementation is moved to another system, can access and modify the fixed table structure. Therefore, the complete interoperability of the RAID implementation with different systems is ensured because all systems are enabled to read the configuration code of the RAID implementation and modify it as necessary. As will be explained in more detail below, the meta data defines the data contained in the drives of the RAID. More particularly, the meta data includes configuration data for each of the drives, such as the type of RAID implementation, the members of the RAID, device identification, capacity, etc.

Figure 2:
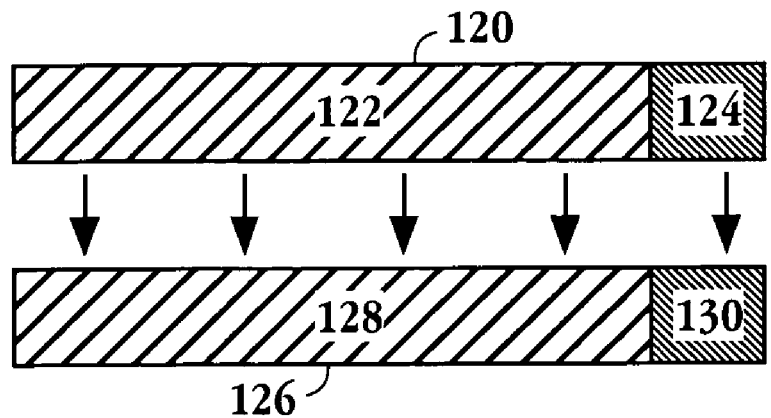
FIG. 2 is a schematic diagram of two disks for a RAID mirroring system created from a single disk containing a user's data in accordance with one embodiment of the invention.

FIG. 2 is a schematic diagram of two disks for a RAID mirroring system created from a single disk containing a user's data in accordance with one embodiment of the invention. Disk 1 120 contains a user's data in region 122 of disk 1. It should be appreciated that disk 1 120 is any suitable storage media, such as the hard drive in a personal computer. The last sector 124 of disk 120 contains meta data which defines the configuration of the RAID implementation, e.g., a RAID mirroring system. In one embodiment, the meta data is configured to fit in one sector of disk 1 120 or any other disk. Disk 2 126 is a copy of disk 1 120. The user's data from region 122 of disk 1 120 is copied to region 128 of disk 2 126. Likewise, meta data from the last sector 124 of disk 1 120 is copied to the last sector 130 of disk 2 126. It will be apparent to one skilled in the art that the meta data will define where the data from region 122 of disk 1 120 is copied to in region 128 of disk 2 among other configuration parameters such as the type of RAID, the members, capacity and device identification.

It should be appreciated that by compacting the meta data for the RAID system so that it fits in one sector and placing the meta data in the last sector of the disk, the process for migrating the data from one disk to another disk is greatly simplified. More particularly, the need for shifting the data is eliminated. Furthermore, disk 1 can contain any amount of a user's data as the meta data is compacted to fit in one sector. The meta data is compacted to fit in one sector by eliminating unnecessary information which is unrecognizable to components made by vendors different than the vendors of the disks for the RAID system. The extraneous data, i.e., data eliminated from the compact meta data, is stored in a file in one embodiment of the invention.

Table 1 provides the structure and definition of the compact meta data in accordance with one embodiment of the invention. It should be appreciated that the table structure provided in Table 1 is exemplary and not meant to be limiting.

TABLE 1

| Field | Bits | Bits Positions | Description |
|---|---|---|---|
| Word#1 = RaidUID | | | |
| UID | 16 | 31–16 | Randomly generated number. This is only to differentiate the RAIDs in an organization from one another so disks do not get mixed up. Allows up to 65535 unique RAIDs to be present in an organization. |
| RaidState | 1 | 15 | 0 means healthy. If it is 1, expect some members to be absent or faulty. |
| RaidAction | 3 | 14–12 | Eight definitions are possible using these three bits which will tell if there is a RAID activity going on such as Nothing (0), Initializing(1), Verifying(2), Scrubbing(3), Rebuilding(4). |
| RaidStripe | 4 | 11–8 | If striped, it tells the size of stripe by finding the power of two. E.g. if this is set as 0100 means FOUR, the stripe size is 16 blocks which is 8 KB. A Value of 0 means 16 i.e. 2 to power 16 which is 65536 blocks. |
| RaidType | 4 | 7–4 | RAID 0, 1, 3, 4, 5 set as 0, 1, 3, 4, 5. The dual levels would be set as 9, 11, 12 and 13 respectively for RAID 10, 30, 40, and 50. |
| VendorUniqueFlags | 4 | 3–0 | Implementers may define their own flags here. |
| WORD#2 = COUNTERS | | | |
| RaidStructUpdateCount | 16 | 31–16 | Each time the meta data on this member is updated, this number is incremented. |
| RaidMemberCount | 8 | 15–8 | Number of members of this RAID. Maximum of 256 members is denoted by a zero. |
| RaidMemberIndex | 8 | 7–0 | The member position being occupied |
| Word#3 = Check Point | | | |
| RaidActionLBA | 32 | 31–0 | Indicates up to what Logical Block Address (LBA) the RaidAction has been completed. |
| Word#4 = VendorUnique | | | Unique to each vendor |

Table 1 includes 3–32 bit words containing the compact meta data, i.e., the RAID configuration. The fields for each word as well as the number of bits, bit positions each word occupies and a brief description of the function of the field are provided. Word #1 is a RAID unique identification (RAID UID) assigned to each member of a RAID. The fields of Word #1 indicate a quality and a state of the RAID. The unique identification (UID) field is a randomly generated number that differentiates RAIDs in an organization from one another. In one embodiment, the randomly generated number involves using a time of day. The RAIDState indicates if the RAID is healthy or if it is degraded, i.e., faulty or missing disks. For example, if a disk was missing the RAID state will reflect that here. In one embodiment, the missing data may be able to be recreated from the remaining configuration data contained by the compact meta data. The RAIDAction defines a RAID activity. Five activity levels are provided in TABLE 1, while three additional levels can be added if needed. The five activities include Nothing, Initializing, Verifying, Scrubbing and Rebuilding. RAIDStripe is only applicable for a RAID configuration that includes striping, such as RAID 5 and RAID 0. RAIDType refers to the well known RAID levels such as disk striping, mirroring, parity and hybrids of each. The VendorUnique field allows a vendor to define proprietary data here in addition to their own flags.

Word #2 of Table 1 is a 32 bit word where the fields of Word #2 include counters further indicating the configuration of the RAID. The RAIDStructUpdateCount is incremented each time the meta data for a member of the RAID is updated. One skilled in the art will appreciate that the update version is helpful where there is a failure of a member. With the version number of the meta data, it can be verified if the meta data for the failed member is the most recent version, which may account for the failure of the RAID member. The RAIDMemberCount field indicates the number of members of the RAID while the RAIDMemberIndex field indicates the position occupied by this particular member of the RAID. Word #3 is a 32 bit word in which a field functions as a tracking check point. For example, if a RAIDAction from the field in Word #1 is interrupted for some reason, the logical block address (LBA) at which the RAIDAction was completed to is tracked so that the RAIDAction may continue from that point upon re-initiation. Word #4 is unique to each vendor.

One skilled in the art will appreciate that where one disk is used for multiple RAIDs by defining separate segments of the disk to be used as members of separate RAIDs, the table structure will need to be replicated for as many times as the disk is segmented. Additionally, two 32 bit words defining the start and the end of the segments would be required. The compact meta data defined in Table 1 allows for the placement of the data into one data sector which enables the meta data to be easily stored in a number of location as described below. In addition the compact meta data, i.e., fixed table structure is configured so that the agencies of different computer systems can read the meta data, and thereby determine the configuration of the RAID. As a result the RAID becomes interoperable among differing computer systems because the compact meta data is accessible. As will be explained in more detail below, the compact meta data is modifiable through a mode select command, thereby enhancing the interoperability of a RAID system associated with the meta data.

Figure 3A:
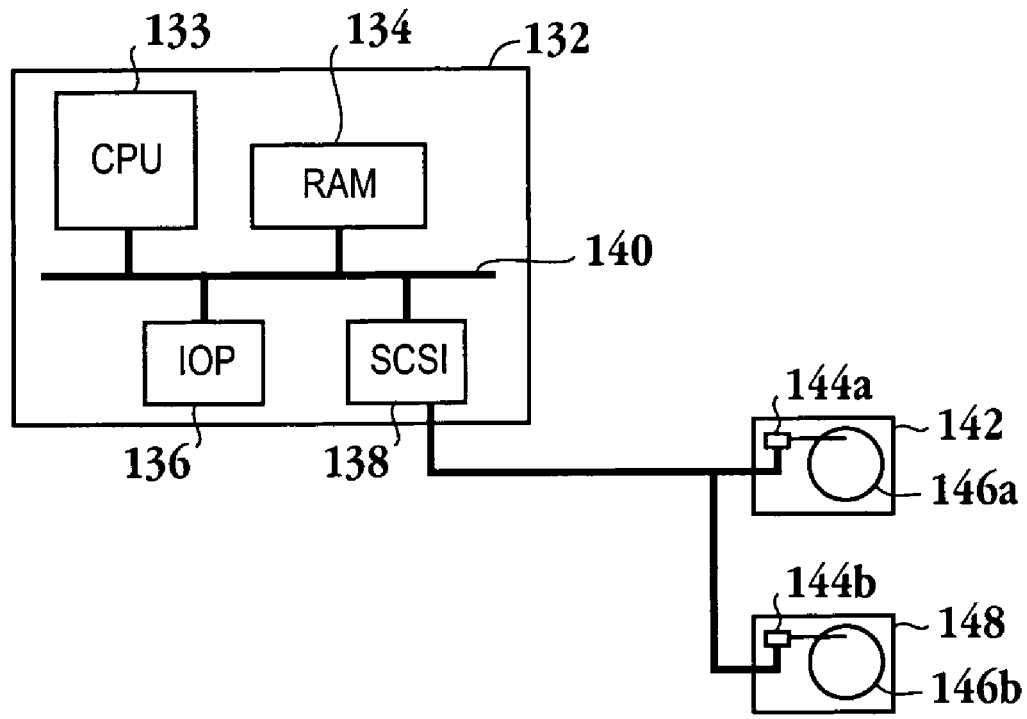
FIG. 3A is a schematic diagram of an interoperable RAID system in accordance with one embodiment of the invention.

FIG. 3A is a schematic diagram of an interoperable RAID system in accordance with one embodiment of the invention. Mother board 132 includes CPU 133 and random access memory (RAM) 134 in communication with input/output processor (IOP) 136 and small computer system interface (SCSI) chip 138 through peripheral component interconnect (PCI) bus 140. SCSI chip 138 is in communication with a RAID implementation. Hard drives 142 and 148 are included in the RAID implementation. Hard drive 142 includes disk 146*a* and interface chip 144*a*. In one embodiment, interface chip 144*a* contains non-volatile random access memory (NVRAM). A portion of the NVRAM is available to all software which communicates with interface chip 144*a*. The size of the NVRAM available as shared information space for disk 146 is about 1 sector (about 512 bytes). It will be apparent to one skilled in the art that the NVRAM also contains other configuration data such as how many heads the drive has. Since the meta data has been compacted to fit in one sector as mentioned above, the meta data for disk 146*a* can be input into the shared information space of the NVRAM.

Still referring to FIG. 3A, hard drive 148 includes disk 146b and interface chip 144b. Interface chip 144b contains NVRAM similar to interface chip 144a. Thus, the meta data corresponding to disk 146b is placed in the NVRAM of interface chip 144b. As mentioned above, the meta data is a maximum of 180 bits in one embodiment, therefore, the meta data can fit in one sector. It should be appreciated that while FIG. 3A shows two hard drives making up the RAID implementation, any number of hard drives can be arranged in the RAID implementation. In addition, the RAID system can be arranged as a mirrored RAID, a striped RAID, parity RAID, hybrid RAID, etc. Furthermore, by locating the meta data in the NVRAM 144a of the interface chip associated with each of the disks of the RAID system, the RAID system becomes interoperable among different systems. That is, the RAID system can be disconnected from motherboard 132 and transferred to another system. The RAID system will be recognized by the other system it is transferred to because the configuration code for the RAID implementation is accessible by the agencies necessary to enable recognition. One skilled in the art will appreciate that the RAID system of FIG. 3A can either be a hardware implementation using a RAID controller or a software implementation such as host based RAID.

Modification of the data in the fixed table structure in the NVRAM 144a and 144b for the embodiment of FIG. 3A is accomplished through a SCSI command. It will be apparent to one skilled in the art that a mode select command, i.e., a SCSI command, can be passed through to each drive. The mode select command is adapted to modify the configuration code of the RAID, i.e., the meta data. For example, the existing mode select command can modify features such as when to perform caching, what speed to operate at, etc. In addition, the mode select command can modify compact RAID meta data. When the RAID implementation is transferred from one system to another system, the new hardware and software of the system that the RAID implementation is transferred may be different. However, the same mode select command will read the compact RAID meta data.

Figure 3B:
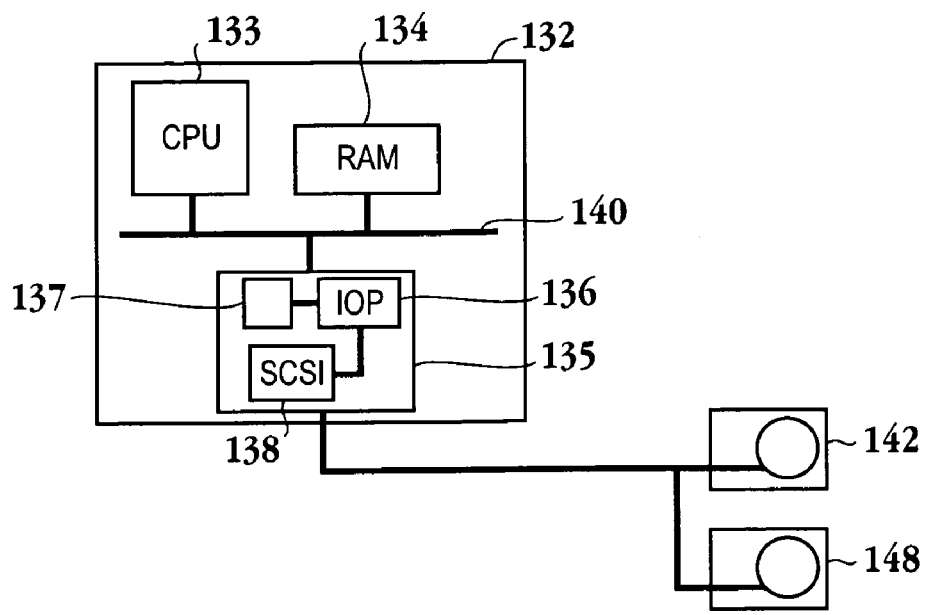
FIG. 3B is another schematic diagram of an interoperable RAID system in accordance with one embodiment of the invention.

FIG. 3B is another schematic diagram of an interoperable RAID system in accordance with one embodiment of the invention. Here, the RAID implementation includes host bus adapter card 135 in communication with PCI bus 140 and hard drives 142 and 148. Host bus adapter card 135 includes IOP chip 136, SCSI chip 138 and NVRAM 137. Similar to the NVRAM 144a and 144b on each hard drive of FIG. 3A, a portion of NVRAM 137 of host bus adapter card 135 is available to all software which communicates with the host bus adapter. The size of NVRAM 137 available as shared information space is about 1 sector (about 512 bytes). In this embodiment, host bus adapter card 135 is considered part of the RAID implementation as it contains the configuration data of the RAID. Therefore, host bus adapter card 135 is transferable with hard drives 142 and 148. Similar to FIG. 3A, the RAID implementation any number of drives in any RAID configuration, i.e., mirroring, striping, parity, etc. Additionally, a mode select command may be used to modify the meta data stored in NVRAM 137.

Figure 3C:
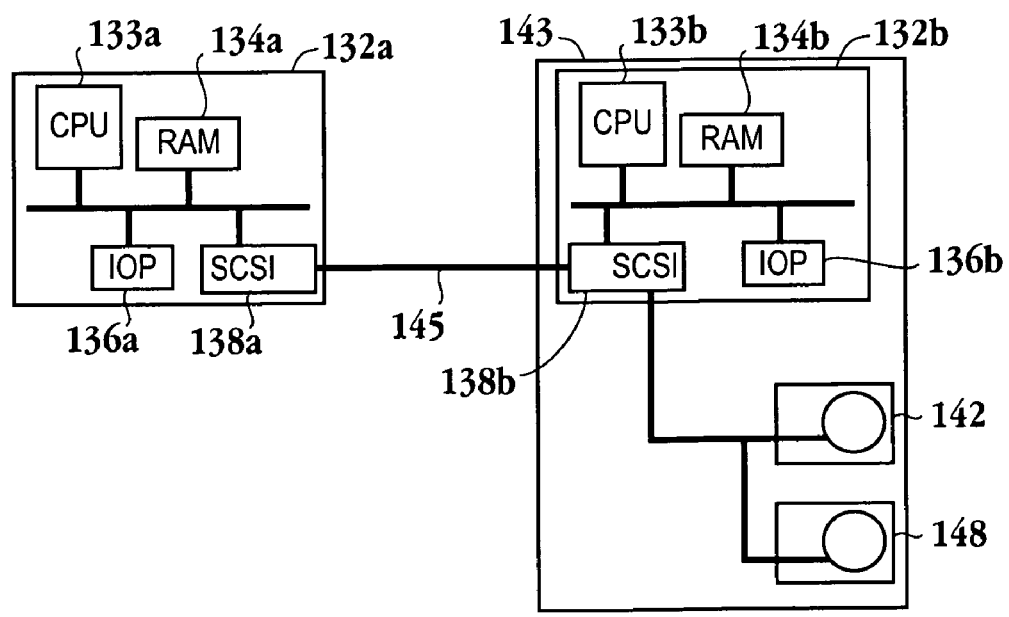
FIG. 3C is a schematic diagram of an interoperable RAID system configured as an external RAID box in accordance with one embodiment of the invention.

FIG. 3C is a schematic diagram of an interoperable RAID system configured as an external RAID box in accordance with one embodiment of the invention. Here, motherboard 132a, such as the motherboard of FIG. 3A, is in communication with external RAID box 143 through SCSI cable 145. Motherboard 132 a includes CPU 133a, RAM 134a, IOP 136a, and SCSI controller 138a in communication with each other through a bus. RAID box 143 includes RAID box controller 132b. RAID box controller 132b includes CPU 133b, RAM 134b, IOP 136b and SCSI controller 138b.

Figure 4:
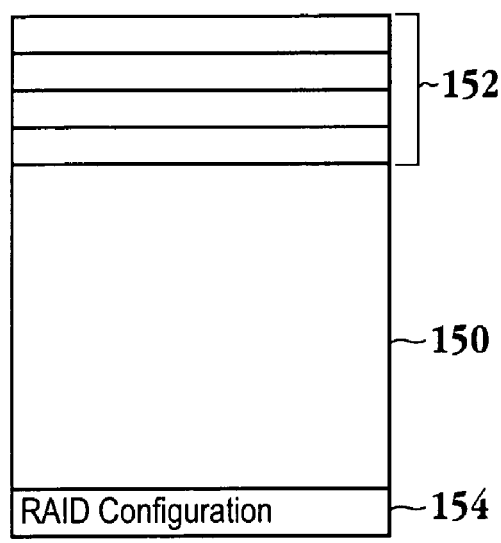
FIG. 4 is a diagram of a disk in an interoperable RAID system in accordance with one embodiment of the invention.

FIG. 4 is a diagram of a disk in an interoperable RAID system in accordance with one embodiment of the invention. The meta data can be stored in the last sector of the disk as mentioned with respect to FIG. 2. Returning to FIG. 4, it is well known that the first sector 152 of disk 150, i.e., sector 0, contains a partition table that is 4×16 bytes at an address 0X1BE. The partition table indicates how much of disk 150 is being used by each operating system. It will be apparent to one skilled in the art that the architectural definition allows only 4 operating systems per disk. Thus, at starting point 0, information on the use of disk 150 by different operating systems resides. By taking one 16 byte section and using it to point to last sector 154, which contains the meta data for the RAID, an operating system is prevented from utilizing the last sector. Thus, the pointer acts as a safety gate for the configuration data in last sector 154 of disk 150. It should be appreciated that each of the disks in the RAID system are similarly structured as discussed herein. Accordingly, the RAID system is configured to be interoperable similar to the embodiment described with respect to FIGS. 3A and 3B. That is to say, the RAID system can be transferred between computer systems made by different vendors. More importantly, the meta data for the RAID system is maintained and is accessible by each computer system that the RAID system, i.e., the disks of the RAID system, is transferred to.

One skilled in the art will appreciate that the embodiments described with respect to FIGS. 3A, 3B, 3C and 4 can be combined in order to determine the optimum location to store the meta data. As mentioned above, the shared information space on the NVRAM of FIGS. 3A and 3B is open to all software and may be consumed by another application. In one embodiment, software code can check if NVRAM 137 of host bus adapter 135 of FIG. 3B has enough capacity for the meta data when setting up the RAID. If there is enough capacity for the meta data, then the meta data will be input to the NVRAM 137 as discussed with respect to FIG. 3B. If there is not a host bus adapter card 135 or NVRAM 137 of FIG. 3B does not have the capacity for the meta data, then the meta data will be input to NVRAM 144a and 144b of each hard drive of the RAID as discussed with respect to FIG. 3A. If there is not enough capacity for the meta data because other software has previously accessed the NVRAM 144a and 144b of FIG. 3A, then the meta data is placed in the last sector of each disk 150 as discussed with respect to FIG. 4. In each instance the compact meta data is stored and configured so it is accessible by the respective agencies of the computer system to which the RAID is transferred to. Therefore, the computer system can recognize and communicate with the transferred RAID.

Figure 5:
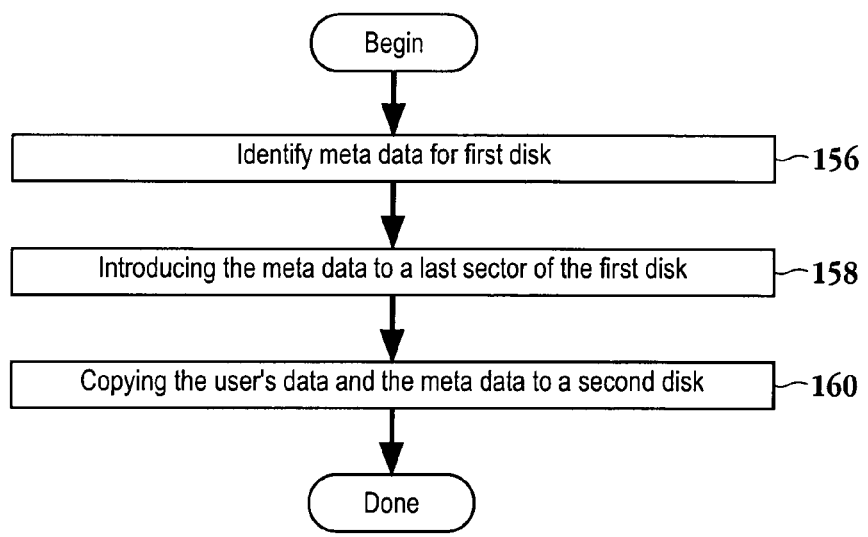
FIG. 5 is a flowchart of the method operations for creating a RAID mirroring system from a disk containing a user's data in accordance with one embodiment of the invention.

FIG. 5 is a flowchart of the method operations for creating a RAID mirroring system from a disk containing a user's data in accordance with one embodiment of the invention. The method initiates with operation 156 where the meta data for the first disk is identified. In one embodiment the meta data is compacted to a maximum of 180 bytes and is configured to be compatible with systems from different vendors. The meta data is a fixed table structure for each hard disk. One suitable fixed table structure is represented by Table 1 above. The method advances to operation 158 where the meta data is introduced to the last sector of the first disk. That is, the fixed table structure is written to the last sector of the first disk. The method then proceeds to operation 160 where the user's data and the meta data are copied to a second disk. A user wishing to create a RAID mirroring implementation from a single hard drive on a personal computer will copy the data on the hard drive to a second disk. Additionally, the meta data copied to the last sector of the first disk in operation 158 is also copied to the last sector of the second disk. Upon completion of operation 160, the first disk and the second disk are arranged as a RAID mirroring system.

Figure 6:
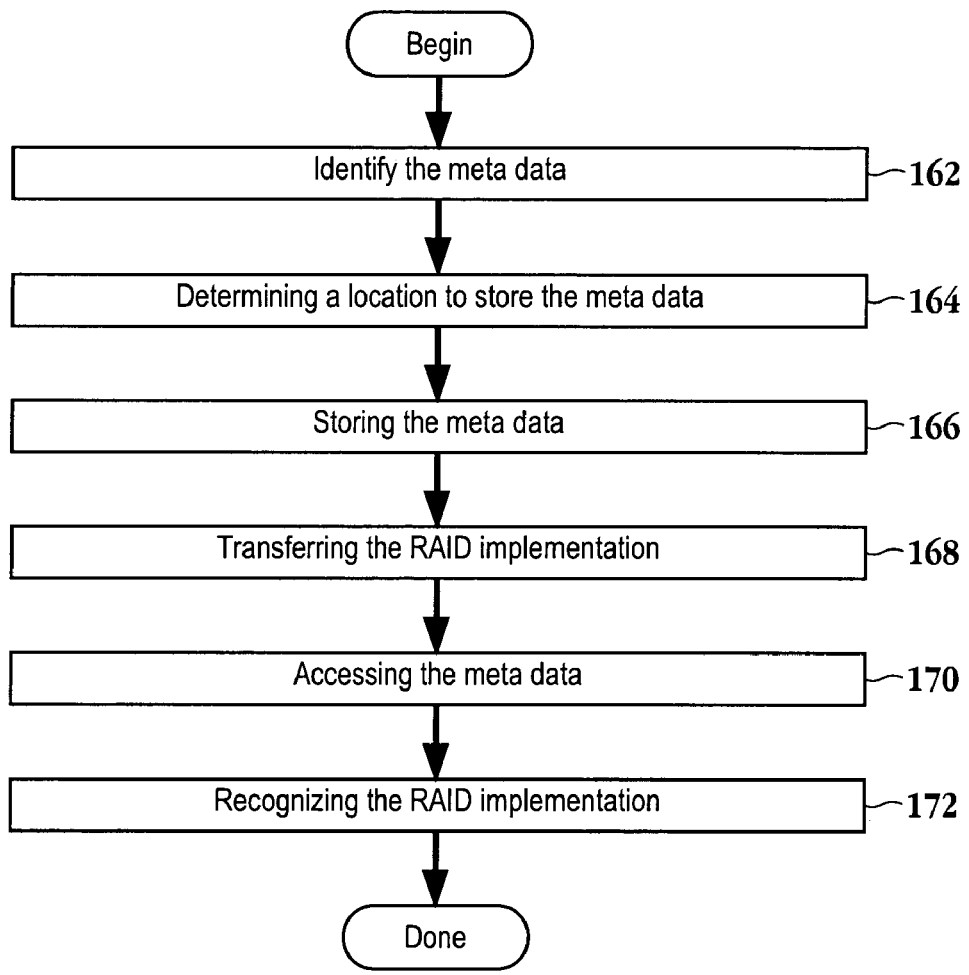
FIG. 6 is a flowchart of the method operations for enabling interoperability of a RAID implementation between different host systems in accordance with one embodiment of the invention.

FIG. 6 is a flowchart of the method operations for enabling interoperability of a RAID implementation between different host systems in accordance with one embodiment of the invention. The flowchart begins with operation 162 where the meta data for the RAID implementation is identified. As mentioned above, the meta data is a compacted fixed table structure associated with each disk, such as the table structure defined in Table 1 above. The method then moves to operation 164 where a location for storing the meta data is determined. In one embodiment, the meta data is stored in non-volatile random access memory (NVRAM). The NVRAM can reside on an interface chip in communication with each disk of the RAID as discussed with reference to FIG. 3A. That is, each disk of the RAID is associated with one interface chip. Alternatively, the NVRAM may reside on a host bus adapter for the RAID as discussed with reference to FIG. 3B. In another embodiment, the meta data on the last sector of each disk of the RAID as discussed with reference to FIG. 4. It should be appreciated that code can be executed to determine the storage location for the meta data as described above with reference to FIGS. 3A, 3B, 3C and 4. The method then advances to operation 166 where the meta data is stored. Here, the data is stored in one of the locations discussed with respect to operation 164. The method proceeds to operation 168 where the RAID implementation is transferred from a first host system to a second host system. For example, the RAID implementation is moved from a personal computer manufactured by a first vendor to a personal computer manufactured by a second vendor.

The method of FIG. 6 then advances to operation 170 where the meta data for the RAID implementation is accessed in response to the start-up of the second host system. It will be apparent to one skilled in the art that the agencies required to look at the fixed table structure, such as the system basic input output system (BIOS), a device driver of the OS and RAID management software access the fixed table structure so that the second host system is able to communicate with the transferred RAID implementation. In one embodiment, if the RAID configuration requires a modification to be compatible with the second host system, a mode select command is issued from a SCSI controller to modify the RAID configuration. For example, a driver may be added or removed by the mode select command in order for the second host system to recognize the transferred RAID implementation. The method then proceeds to operation 172 where the second host system recognizes the RAID implementation. Here, the RAID implementation is fully functional with the second host system due to the compaction of the meta data in a format that allows for interoperability of the RAID implementation between different systems.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating a RAID mirroring system from a first disk containing a user's data, the method comprising:
   identifying meta data for the first disk;
   introducing the meta data to a last sector of the first disk;
   copying the user's data and the meta data of the first disk to a second disk, the meta data being copied to a last sector of the second disk; and
   arranging the first disk and the second disk as a RAID mirroring system.

2. The method of claim 1, wherein is the meta data is a fixed table structure including four 32-bit words.

3. The method of claim 2, wherein a first word contains fields indicating a quality and state for each member of the RAID mirroring system, a second word contains fields providing counters indicating a configuration of the RAID mirroring system and a third word contains a field acting as a tracking checkpoint for the RAID mirroring system.

4. The method of claim 1, wherein the RAID mirroring system is interoperable between different host systems.

5. A method for enabling interoperability of a RAID implementation between different host systems, the method comprising:
   identifying meta data for a RAID implementation;
   storing the meta data of the RAID implementation;
   transferring the RAID implementation from a first host system to a second host system; and
   accessing the meta data for each disk of the RAID implementation in response to the start-up of the second host system,
   wherein the meta data is stored in one of a non-volatile random access memory (NVRAM) associated with each disk of the RAID implementation and a last sector of each disk of the RAID implementation.

6. The method of claim 5 wherein the meta data is a fixed table structure including four 32-bit words.

7. The method of claim 6, wherein a first word contains fields indicating a quality and state for each member of the RAID mirroring system, a second word contains fields providing counters indicating a configuration of the RAID mirroring system and a third word contains a field acting as a tracking checkpoint for the RAID mirroring system.

8. The method of claim 5, wherein the method operation of identifying the meta data includes:
   determining a storage location for the meta data.

9. A method for enabling meta data of a RAID implementation to be recognized by different host systems, the method comprising:
   identifying meta data for a RAID implementation;
   storing the meta data of the RAID implementation in a non-volatile random access memory (NVRAM) if access to the NVRAM is available;
   if access to the NVRAM is not available, then storing the meta data for the RAID implementation in a last sector of each disk of the RAID implementation,
   transferring the RAID implementation from a first host system to a second host system;
   accessing the meta data in the NVRAM or the last sector of each disk of the RAID implementation in response to the start-up of the second host system; and
   determining if the meta data requires modification to communicate with the second host system.

10. The method of claim 9 wherein the meta data is a fixed table structure including four 32-bit words.

11. The method of claim 10, wherein a first word contains fields indicating a quality and state for each member of the RAID mirroring system, a second word contains fields providing counters indicating a configuration of the RAID mirroring system and a third word contains a field acting as a tracking checkpoint for the RAID mirroring system.

12. The method of claim 9, wherein if the method operation of determining if the meta data requires modification to communicate with the second host system indicates modification is necessary, the method includes:
   issuing a mode select command to modify the meta data.

13. A computer readable media containing program instructions for enabling interoperability of a RAID implementation between different host systems, the computer readable media comprising:
   program instructions for identifying meta data for a RAID implementation;
   program instructions for storing the meta data of the RAID implementation;
   program instructions for transferring the RAID implementation from a first host system to a second host system; and
   program instructions for accessing the meta data for each disk of the RAID implementation in response to the start-up of the second host system wherein the meta data is stored in one of a non-volatile random access memory (NVRAM) associated with each disk of the RAID implementation and a last sector of each disk of the RAID implementation.

14. The method of claim 13 wherein the meta data is a fixed table structure including four 32-bit words.

15. The method of claim 14, wherein a first word contains fields indicating a quality and state for each member of the RAID mirroring system, a second word contains fields providing counters indicating a configuration of the RAID mirroring system and a third word contains a field acting as a tracking checkpoint for the RAID mirroring system.

16. A RAID system, comprising:
   at least two disks arranged as a RAID implementation; and
   meta data configured to fit on a sector of a storage medium, the meta data defining a RAID configuration, and the meta data configured to be accessible and modifiable in order for the RAID system to be interoperable with different host systems, wherein the meta data is stored on a last sector of the at least two disks.

17. The RAID system of claim 16, wherein the RAID implementation is one of a mirrored RAID, a striped RAID, a parity RAID and a hybrid RAID.

18. The RAID system of claim 16, wherein the meta data includes four 32-bit words.

19. The RAID system of claim 16, wherein a first word contains fields indicating a quality and state for each member of the RAID mirroring system, a second word contains fields providing counters indicating a configuration of the RAID mirroring system and a third word contains a field acting as a tracking checkpoint for the RAID mirroring system.

20. The RAID system of claim 16, wherein the meta data is stored in a sector of the non volatile random access memory associated with each of the at least two disks.

* * * * *